United States Patent [19]

Seegmiller et al.

[11] 4,073,482
[45] Feb. 14, 1978

[54] INERTIAL BARRIER SYSTEM

[75] Inventors: Wan Seegmiller; Bruce O. Young, both of Sacramento, Calif.

[73] Assignee: Energy Absorption Systems, West Sacramento, Calif.

[21] Appl. No.: 641,911

[22] Filed: Dec. 18, 1975

Related U.S. Application Data

[63] Continuation of Ser. No. 496,784, Aug. 12, 1974, abandoned.

[51] Int. Cl.² .......................... F16F 7/12; E01F 15/00
[52] U.S. Cl. .................................. 267/139; 256/13.1; 404/6
[58] Field of Search ............... 267/116, 139; 256/13.1, 256/1; 404/6; 116/63; 40/125 H, 125 N; 220/210

[56] References Cited

U.S. PATENT DOCUMENTS

| 3,288,440 | 11/1966 | Schimmelpenninok et al. ... 256/13.1 |
| 3,606,258 | 9/1971 | Fitch ........................................ 404/6 |
| 3,916,816 | 11/1975 | Fitch ...................................... 40/125 H |

Primary Examiner—James B. Marbert
Attorney, Agent, or Firm—Melvin F. Jager

[57] ABSTRACT

An inertial barrier system for attenuating the energy of errant vehicles including inner module means defining an integral frangible container of generally wine glass-type configuration with an enlarged upper portion and a reduced lower stem portion for receiving a continuous mass of dispersible energy-attenuating material throughout the container height.

8 Claims, 5 Drawing Figures

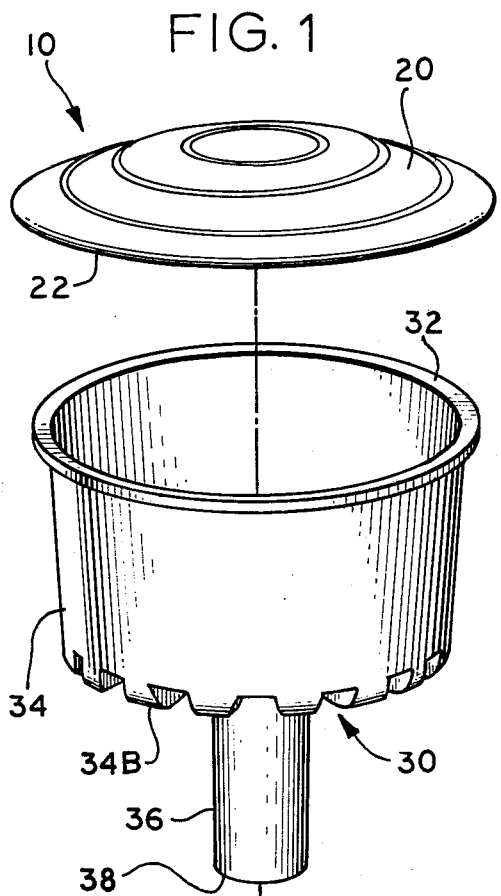
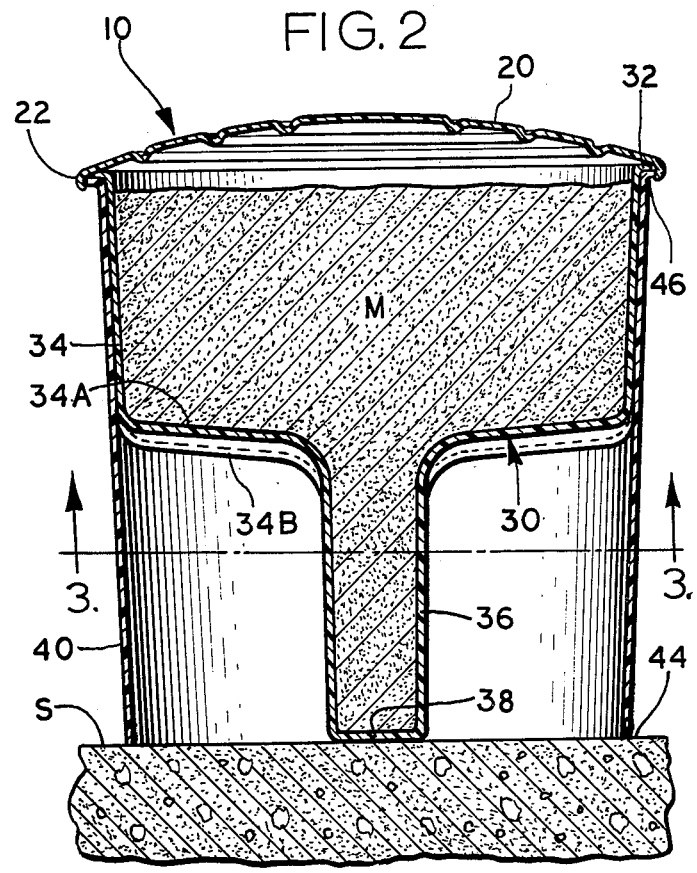
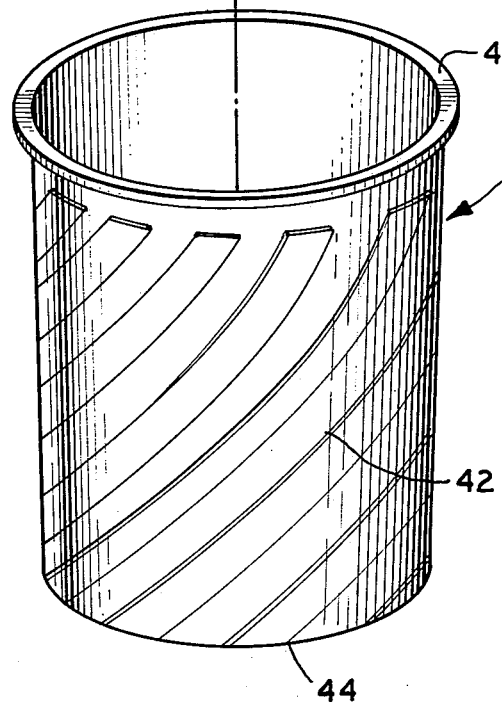
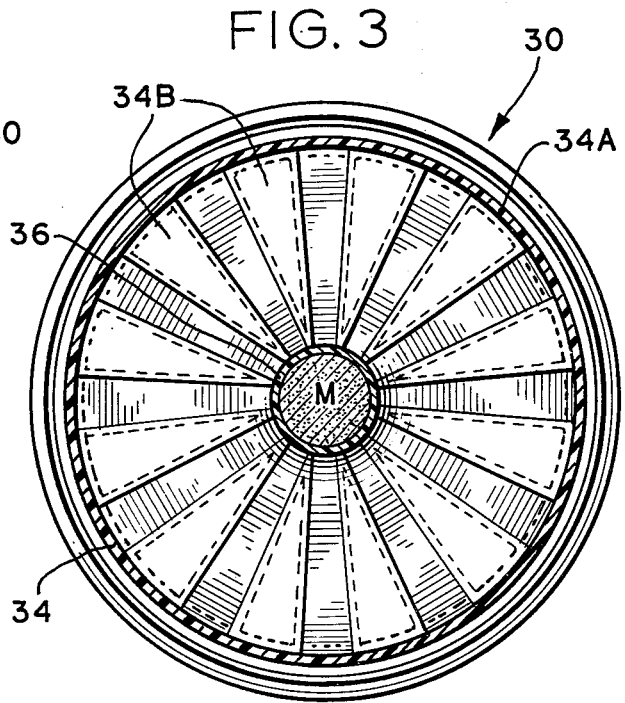

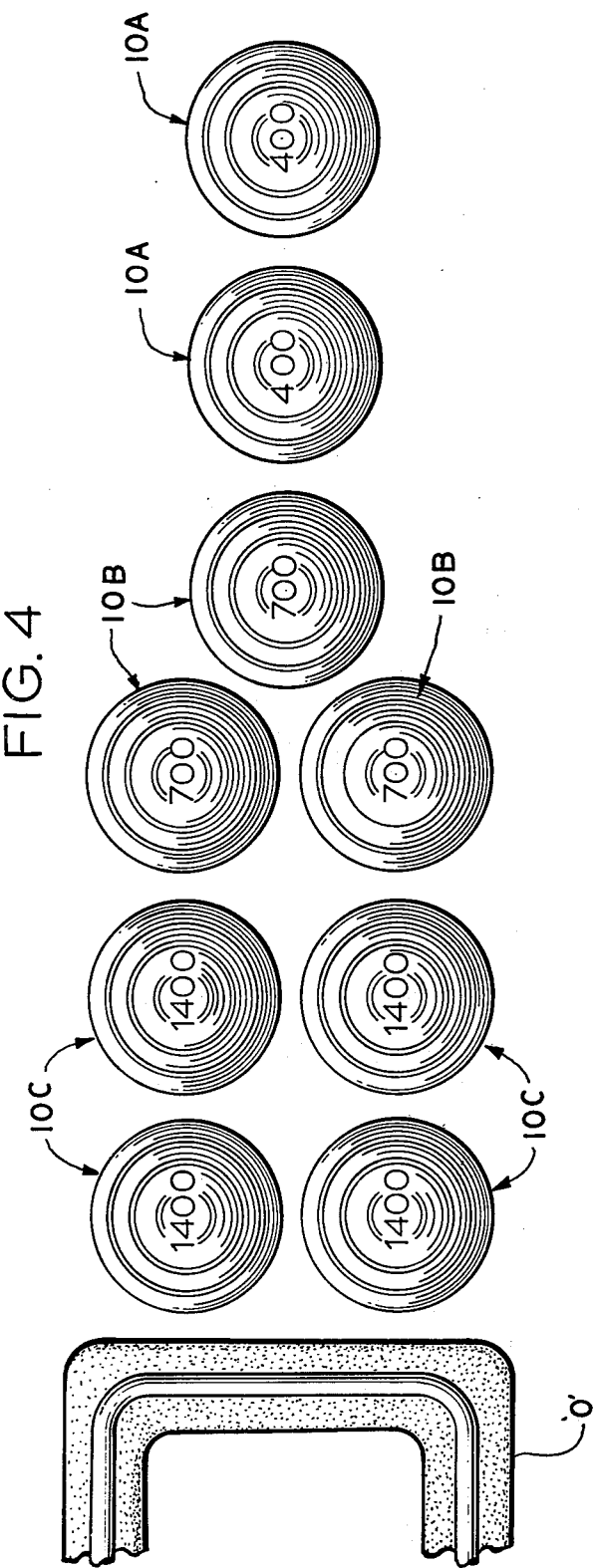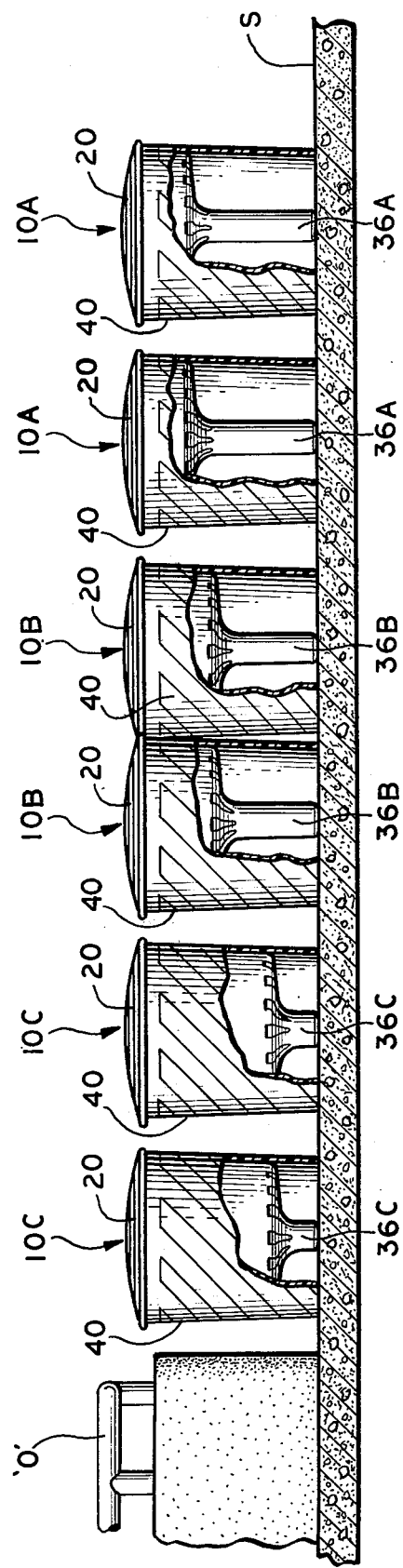

INERTIAL BARRIER SYSTEM

BACKGROUND AND GENERAL DESCRIPTION

This is a continuation of application Ser. No. 496,784, filed Aug. 12, 1974 now abandoned.

This invention relates to an inertial barrier system for attenuating the energy of errant vehicles.

It is well-known that many obstructions located adjacent the roadbeds of highways create major safety hazards for vehicles and their passengers. These obstructions take the form of overpass support columns, bridge abutments, guardrails, road signs and railings, and the like. Since the existence of these hazards has been recognized, a major effort has begun to provide some form of energy attenuation in front of the obstructions, in the potential path of travel of an errant vehicle, in an effort to reduce damage to vehicles and personal injury to passengers. One example of such an energy attenuating device is the Liquid Shock Absorbing Buffer system described in U.S. Pat. No. 3,672,657, issued on June 27, 1972 and assigned to the assignee of the present invention.

Some prior attempts to use sand or other forms of readily dispersible particulate materials as the energy attenuating medium before roadbed obstacles have met with limited success, but possess inherent design deficiencies. Principally, the design of some systems presently available allows the system to degrade after installation to the point of substantially lessening or defeating the intended energy-attenuation performance of the system.

For instance, one of the problems prevalent in the industry is "ramping", that is the tendency of the errant vehicle to rise over an energy attenuation system and possibly overturn, due to the accumulation of the energy-absorbant material, and crash debris at a low relationship with respect to the center of gravity of the errant vehicle. One well-known technique for minimizing ramping is to locate the center of gravity of the dispersible energy-absorbing mass essentially in a direct line with the average center of gravity of a moving vehicle; for example, approximately 22 to 25 inches above the road surface. The elevation of the mass center of gravity tends to eliminate the development of a force couple upon impact which would ramp or nose-dive the errant vehicle.

Some available systems for energy attenuation initially locate the center of gravity of the mass at the appropriate elevated location, but are unable to maintain the design performance of the system in a stable and efficient manner. The prior use of a multitude of component parts for the energy-absorbing module including parts having different densities and seals which attempt to maintain the dispersible mass in the elevated condition tend to allow the system to degrade substantially due to environmental conditions.

Roadbed vibrations is one of the principal factors in the degradation of energy-attenuation systems. Such vibrations, for instance, detrimentally affect the performace of any material seal between two vibrating module components, particularly when the components have a density substantially different from the density of the mass used as the energy-attenuating material. Vibration of such prior system easily can cause the seal to leak and feed the dispersible mass downwardly toward or onto the support surface. Such a design failure presents the inherent danger of ramping by the shifting of the mass of a degraded system to a location below the designed center of gravity for the system. Ramping may also be enhanced in such systems by the location of a substantial amount of crash debris from the module below the designed center of gravity.

The prior use of module components which have a density substantially different from the density of the dispersible mass and interposed between the support surface and the mass, also tends to degrade the system by allowing the modules to move laterally or "walk" along the support surface as a result of roadbed vibrations. Evidently, the placement of module components of a different, lighter density between the support surface causes the module to vibrate at a different vibration frequency than the mass, and accelerates the tendency of the module to "walk" on the surface. The walking in turn can defeat the design of the system by dislocating or even overturning the modules.

Accordingly, the principal object of this invention is to provide an inertial barrier system for attenuating the energy of errant vehicles which has a minimum number of component parts, and is efficient and economical to install and maintain. This invention provides an effective and stable barrier design which does not degrade excessively due to environmental conditions. In the present system, the center of gravity of the energy-attenuating mass is elevated, to prevent ramping and the like in a manner which minimizes "walking" and the other foregoing degrading effects of roadbed vibration. Furthermore, the present system facilitates the location of energy-attenuation modules in an array having a gradiently increasing energy-absorption characteristic which will maintained intact before the impact of an errant vehicle.

Briefly, the above-described feature are accomplished by the system in accordance with this invention by providing an inertial barrier module defining an integral, frangible and continuous container having a generally wine-glass type configuration. The upper portion of the module is enlarged and open, and the lower stem portion of the module is reduced and closed. The frangible container receives a mass of disbursible energy attenuating material, such as sand, continuously throughout the entire container height. This integral module prevents shifting of the mass, and the container shape elevates the center of gravity of the mass to the enlarged upper portion. The lower stem portion of the container permits the container to be self-supporting, and operatively connects the mass to the supporting surface. Placement of the mass in the stem thereby assures that the container and the mass will vibrate, if at all, at substantially the same frequency as the supporting surface vibrations, and there are minimal differential vibrations between the container and the mass which would cause walking or shifting of the mass downwardly. The reduced stem portion operatively connected to the surface also substantially increases the pressure of the container on the surface because of the reduced contact area. This arrangement also substantially reduces the tendency of the module to walk due to roadbed vibrations.

EXEMPLARY EMBODIMENTS

Further objects and features of the present invention will become more apparent from the following description of exemplary embodiments thereof, taken in conjunction with the accompanying drawings, in which:

FIG. 1 is an exploded perspective view showing the exterior of the components of an energy attenuating system in accordance with this invention;

FIG. 2 is a cross-sectional elevational view of the system illustrated in an assembled condition and filled with a charge of dispersible energy attenuating material;

FIG. 3 is a cross-sectional view taken along the line 3—3 in FIG. 2, illustrating structural reinforcing means provided in the illustrated embodiment of the system;

FIG. 4 is a plan view illustrating an array of energy attenuating modules arranged in form of a roadbed obstacle in accordance with this invention; and FIG. 5 is an elevational view of the module array illustrated in FIG. 4, with portions of the module shown in section to illustrate the design of the modules to provide the array with gradiently varying energy-attenuation characteristics.

A module assembly in accordance with the present invention is indicated generally by the reference numeral 10 in FIG. 1. The module assembly 10 is a simplified design including a minimum number of component parts. The parts are formed from frangible material so that they do not provide a barrier to the absorption of energy by the material contained with in the module 10 during impact by an errant vehicle. Suitable frangible materials for the module 10 assembly are water-extended polyester, or foamed high-density polyethylene. It is preferred, for simplicity of manufacture and design to have all component parts made from the same material.

As seen in FIG. 1, the illustrated embodiment of the module assembly 10 is generally circular or cylindrical in configuration. The module 10 includes an upper lid 20, an inner module 30 and a stabilizer 40. As seen in FIG. 2, a downturned rim 22 on the lid 20 snaps over the other components of the assembly 10 to close the assembly. The lid 20 can be readily removed to fill or inspect the inner module 30.

The stabilizer 40 in the illustrated embodiment comprises an open-ended, continously formed cylindrical member. The stabilizer exterior can be painted or embossed with safety cheverons 42, or the like, to increase th visibility of the assembly. As seen in FIG. 2, the lower rim of the stabilizer 40 rests on the supporting surface S, and laterally stabilizes the components of the module assembly 10. The upper rim 46 of the stabilizer may be formed outwardly for receiving the rim 32 of the inner module 30. The vertical height of the stabilizer 40 is coordinated with the height of the inner module 30, as seen in FIG. 2, so that the inner module is in operative engagement with the support surface S.

The inner module 30 is a frangible container which is self-supporting and continous. In accordance with this invention, the inner module 30 includes an enlarged upper portion 54 which is generally cylindrical in configuration. The upper portion 34 is open and terminates in the rim 32 which seats around the upper rim 46 of the stabilizer 40 when the components of the assembly 10 are assembled. The upper portion 34 therefore allows a charge of particulate dispersible material, such as sand to be placed within the module 30.

The inner module 30 further includes a lower stem portion 36 of substantially reduced volume and cross-sectional area when compared to the upper portion 34. The lower portion 36 is integral with the upper portion 34 and is closed by an integral bottom wall 38. As seen in FIG. 2, the bottom wall 38 is designed to engage with or otherwise operatively connect with the support surface S. In the illustrate embodiment the stem portion 36 is generally cylindrical in configuration, and is in axial alignment with the top portion 34.

The central part of the inner module 30, between the upper portion 34 and the lower portion 36 defines an annular, lateral supporting wall 34A, for supporting material M. As seen in FIG. 2, the transitions between the wall 34A and the upper and lower portions 34 and 36 are curved to reduce the internal stresses of the material from which the module 30 is formed. The curved transitions also enhance the vibration dampening characteristics of the material forming the module 30.

In addition, as seen in FIG. 3 the wall 34A is provided with a plurality of integral and uniformly spaced struts 34B which substantially strengthen the wall 34A.

As seen particularly in FIGS. 1 and 2, the inner module 30 thereby defines a continuous frangible container for a selective quantity of dispersible mass M, such as sand. The general outline of the inner module 30 is wine-glass in configuration, with the lower portion 36 defining the narrow stem portion of the wine glass. The design for the module 30 possesses several improved features. The mass M is vertically continous throughout the height of the combined upper portion 34 and lower portion 36 of the module. Thus, no material of different density isolates the mass M from the supporting surface S. The vibrations of the surface S will be communicated directly to the mass M due to this design, and the propensity of the module 30 to develop different vibration frequencies for different components is reduced. The continous nature of the module 30 also eliminates the possibility of parts of seal separating to cause a leak in the module and a downward shifting of the mass M. The reduced area of the module bottom wall 38 also substantially increases the pressure of the mass M and the module 30 on the support surface S, to reduce the "walking" of the module assembly 10 due to roadbed vibrations.

Moreover, the inner module 30 combines these features with a design which assures that the center of gravity of the mass M is elevated to reside in the enlarged upper portion 34 of the module. The wine-glass configuration of the module 30 produces the elevated center of gravity inherently when the module is filled with the mass M during installation. The designed height of the portions 34, 36 and the density of the mass M can be easily coordinated to produce the locus for the center of gravity (e.g. 22-25 inches above the roadbed) needed to prevent ramping of the errant vehicle. The continous container formed by the module 30 thereby retains the major portion of the mass M in a position for maximum energy attenuation, and channels the dispersal of the mass M upon impact by an errant vehicle.

FIGS. 4 and 5 illustrate a preferred array for a plurality of module assemblies 10 in front of a road obstacle '0'. A gradient increase in energy attenuation is produced in this array by selectively varying the mass M contained in successive module assemblies 10. To accomplish this result, the initial module assemblies 10A in the array are of lesser mass for example 400 lbs., to cause a relatively small energy attenuation during the initial impact by a vehicle. The next series of modules 10B have an increased mass, for example 700 lbs., to increase the energy attenuation, and decelerate the errant vehicle more rapidly, as compared to the modules 10A. Attenuation can be further assured by locating a plurality of modules 10B laterally, as shown in FIG. 4. Finally, the array is provided with a series of modules 10C having a designed maximum energy attenuation mass, such as provided by 1400 lbs., of sand. The modules 10C which preferably are arranged in a plurality of multi-module rows, are designed to attenuate the energy of an errant vehicle to the extent of bringing the vehicle to a cushioned stop.

FIG. 5 illustrates to ease with which a gradiently increasing energy attenuation characteristic can be provided in a module array by means of this invention. The outer stabilizers 40 and the lids 20 for the module assemblies 10A-C can be of standard size and construction. The varying attenuation for the array is accomplished by varying the dimensions of the inner modules 30 along the length of the array. As seen in FIG. 5 the different volemetric capacity for the modules 10A-C, and the resulting different attenuation characteristics are provided by selectively varying the vertical height of the lower stem portion 36 of the inner modules 30. Generally, the increase in capacity and attentuation of each module 30 is inversely proportional to an increase in the height of the associated stem 36, so that the stems 36A on the modules 10A are longer than the stems 36B and 36C in proportion to the volme of mass M contained in the related module assemblies. In each module 10A-C, the center of gravity of the mass M continues to reside at an elevated location within the upper portion 34 of the module. Hence, this invention allows a gradiently varying attentuation to be readily designed into an array without degrading the non-ramping and other advantageous features of the modules 10, and without a multiplication of the component parts of the system.

Although the invention has been described above with a certain degree of particularlity with respect to several embodiments, it should be understood that this disclosure has been made only by way of example. Consequently, numerous changes in the details of construction and in the combination and arrangements of the components as well as the possible modes of utilization for the inertial barrier in accordance with this invention will be apparent to those familiar with the art, and may be resorted to without departing from the scope of the invention.

What is claimed is:

1. An inertial barrier system for attenuating the energy of errant vehicles comprising:
    module means defining a frangible container having a generally wine-glass type configuration with an open and enlarged upper portion and a closed and reduced lower stem portion for receiving a continuous mass of dispersible energy-attenuating material having a substantially uniform density throughout the material height so that the center of gravity of said mass is above said lower stem portion;
    means to cover said open portion of said module means; and
    means to stabilize said module means on a support surface in a manner which will transmit the vibrational energy of said surface to said continuous mass in said module means, said stabilizing means comprising an open-ended member engageable with said upper portion of said module means to stabilize said module means, with said stem portion operatively engaged with said support surface to support said module and said mass and transmit the vibrational energy of said surface to said mass.

2. An inertial barrier system in accordance with claim 1 wherein said module means has a generally circular cross-section area and wherein said stabilizing means comprises a frangible generally cylindrical member having a support rim at the upper end for engagement with said module upper portion and further having an opening at the lower end to permit said module stem portion to engage said support surface.

3. An inertial barrier system in accordance with claim 1 wherein said cover means, module means and stabilizing means are formed from a frangible polymeric material.

4. An inertial barrier system in accordance with claim 1 wherein the intermediate portion of said container between said upper and lower portions includes a radius of curvature to strengthen said container to withstand the stress of said continuous mass.

5. An inertial barrier system in accordance with claim 4 wherein said intermediate portion of said container includes integral strut means to further strengthen said container against the stress of said mass.

6. A inertial barrier system for attenuating the energy of errant vehicles comprising:
    a plurality of frangible module means arranged in a selected array adjacent a hazard in the path of travel of a vehicle, each of said module means including a frangible container having a generally wing-glass type configuration with an open and enlarged upper portion for receiving a continuous mass of dispersible energy-attenuating material having a substantially uniform density throughout the material height so that the center of gravity of said mass is above said lower stem portion;
    means to cover said open portion of said module means; and
    means to stabilize said module means on a support surface in a manner which will transmit the vibrational energy of said surface to said continuous mass in said module means, said stabilizing means comprising an open-ended member engageable with said upper portion of said module means to stabilize said module means, with said stem portion operatively engaged with said support surface to support said module and said mass and transmit the vibrational energy of said surface to said mass.

7. An inertial barrier system in accordance with claim 6 wherein the mass of energy-attenuating material within said container is varied along the path of travel of said vehicle to provide said array with gradiently increasing energy attenuation.

8. An inertial barrier system in accordance with claim 7 wherein said mass is varied by varying the relative height of the upper portion and lower stem-portion of said inner module means included in said array.

* * * * *

UNITED STATES PATENT AND TRADEMARK OFFICE
CERTIFICATE OF CORRECTION

PATENT NO. : 4,073,482
DATED : Feb. 14, 1978
INVENTOR(S) : Wan Seegmiller; Bruce O. Young It is certified that error appears in the above-identified patent and that said Letters Patent are hereby corrected as shown below:

In the Specification:

Column 1, line 19, "energy attenuating" should be --energy-attenuating--;

Column 1, line 35, "energy attenuation" should be --energy-attenuation--;

Column 1, line 48, "energy attenuation" should be --energy-attenuation--;

Column 2, line 36, "feature" should be --features--;

Column 2, line 44, "energy attenuating" should be --energy-attenuating--;

Column 3, line 2, "energy attenuating" should be --energy-attenuating--;

Column 3, line 6, "energy attenuating" should be --energy-attenuating--;

Column 3, line 24, "with in" should be --within--;

Column 3, line 43, "th" should be --the--;

Column 3, line 47, "may be" should be --is--;

UNITED STATES PATENT AND TRADEMARK OFFICE
CERTIFICATE OF CORRECTION

PATENT NO. : 4,073,482
DATED : Feb. 14, 1978
INVENTOR(S) : Wan Seegmiller; Bruce O. Young It is certified that error appears in the above-identified patent and that said Letters Patent are hereby corrected as shown below:

In the Specification: (cont'd)

Column 4, line 1, "illustrate" should be --illustrated--;

Column 4, line 21, "The" should be -- This --.

Column 4, line 43, "the", second occurrence, should be -- this-

Column 4, line 61, "energy attenuation" should be --energy-attenuation--;

Column 5, line 23, "volme" should be --volume--;

In the Claims:

Column 6, line 33, "wing-glass" should be --wine glass--

Signed and Sealed this

Eighth Day of August 1978

[SEAL]

Attest:

RUTH C. MASON
*Attesting Officer*

DONALD W. BANNER
*Commissioner of Patents and Trademarks*